United States Patent [19]

Yamauchi

[11] Patent Number: 5,067,120
[45] Date of Patent: Nov. 19, 1991

[54] DISK DRIVE APPARATUS
[75] Inventor: Satoru Yamauchi, Ibaraki, Japan
[73] Assignee: Hitachi Maxell, Ltd., Osaka, Japan
[21] Appl. No.: 334,562
[22] Filed: Apr. 7, 1989
[30] Foreign Application Priority Data Apr. 7, 1988 [JP] Japan .................. 63-84142
Jun. 7, 1988 [JP] Japan .................. 63-138541

[51] Int. Cl.$^5$ .............................. G11B 7/00
[52] U.S. Cl. ................................ 369/59
[58] Field of Search .............. 360/51; 369/59, 48, 369/49

[56] References Cited
U.S. PATENT DOCUMENTS 4,835,759 5/1989 Saito et al. ................ 369/59
4,972,401 11/1990 Carasso et al. ............ 369/59

FOREIGN PATENT DOCUMENTS

0077642 4/1983 European Pat. Off. .
0152245 8/1985 European Pat. Off. .

Primary Examiner—Vincent P. Canney

[57] ABSTRACT

A disk drive apparatus derives 0-order light and 1-order light from an output laser beam of a single laser source, reads a prepit train on a disk by the 0-order light and the 1-order light to reproduce synchronization signals, generates a first synchronization signal based on the synchronization signal reproduced by the 0-order light, and generates a second clock based on the second synchronization signal reproduced by the 1-order light. The synchronization signal reproduced by the 0-order light is delayed by a delay circuit and a selection circuit selects the synchronization signal reproduced by the 1-order light in a write mode or the synchronization signal produced by the delay circuit in a read mode, to generate the second clock. The first clock is used as a data write clock in the write mode and as a data read clock in the read mode. The second clock is used as the data read clock in the write mode.

6 Claims, 6 Drawing Sheets

DELAYING CLOCK SIGNAL

FIG. 1
DELAYING CLOCK SIGNAL

FIG. 2

FIG. 3
DELAYING CLOCK SIGNAL

FIG. 4 DELAYING AND DEMODULATION

FIG. 5 INTEGRAL FORMATION OF DETECTOR

FIG. 6 PREPITS AND DATA SPOTS

FIG. 7 SPIRAL TRACK DISK

FIG. 8 CONCENTRIC TRACK DISK

FIG. 9 CONTINUOUS SERVO SYSTEM

FIG. 10 SAMPLE SERVO SYSTEM

DISK DRIVE APPARATUS

BACKGROUND OF THE INVENTION

The present invention relates to a drive apparatus such as a magneto-optical disk or an over-writable optical disk, and more particularly to generation of data write/read clocks.

Synchronization signals and sector addresses are recorded as prepit trains in the magneto-optical disk or the over-writable optical disk (hereinafter simply referred to as a disk). When data is to be written into such a disk, the prepit trains are read to generate the synchronization signals, a write clock is generated based on the synchronization signals, and the data write timing is attained by the clock. As a result, the data is written into the disk in synchronism with the synchronization signal. When the data is to be read from the disk, the prepit trains are read to reproduce the synchronization signals, and the read clock for reproducing the data is generated based on the synchronization signal.

When the data is written into the disk, it is necessary to check whether the data has been written correctly. To this end, the drive apparatus which permits writing and reading of data on a writable disk is provided with a direct read-after-write (DRAW) function to read the data simultaneously with the writing of the data in order to check the correctness of the data writing.

In order to effect the DRAW, a write laser beam, having sufficient power and a read laser beam which has sufficient power to read the data but does not destroy the data on the disk, are required. In a write mode in which the data is written into the disk, the data is written by the write laser beam and the written data is read by the read laser beam. The prepit trains on the disk are also read by the write laser beam, and the write clock is generated based on the reproduced synchronization signals. In a read mode in which the data written on the disk is read, the write laser beam is turned off and the data is read by the read data beam.

In this manner, the DRAW is attained. In the prior art, it is common to use separate light sources for the write laser beam and the read laser beam. Thus, two laser sources are used to write and read the data.

On the other hand, a technique to generate 0-order light, i.e. the strongest light beam, and 1-order light, i.e. the second strongest light beam, from an output light of a single laser source by a diffraction grating in order to attain the DRAW is known by, for example, JP-A-62-252552. In the prior art, data is written and read into and from a magneto-optical recording medium. A single semiconductor laser, 0-order light (or main beam) and two 1-order lights (or sub beams) are generated from the single laser beam emitted from the semiconductor laser by a diffraction grating. The laser beams are directed to the magneto-optical recording medium. Radiation positions of the laser beams are set such that a spot of one of the 1-order lights is ahead of a spot of the 0-order light while a spot of the other 1-order light is behind the spot of the 0-order light. In the write mode, the 0-order light is used with a magnetic field from a magnetic field generation device to write data into the magneto-optical recording medium, the 1-order light whose spot is ahead of the spot of the 0-order light is used to read an address previously written in the magneto-optical recording medium, and the 1-order light whose spot is behind the spot of the 0-order light is used to read the data written by the 0-order light. In this manner, the DRAW is attained. In the data read mode, the 0-order light is used.

An example of generation of a write clock and a read clock in a disk drive apparatus is explained with reference to FIG. 2. Numeral 1 denotes a disk, numeral 2 denotes a 0-order light optical pickup, numeral 3 denotes a 1-order light optical pickup, numerals 4 and 5 denote preamplifiers, numerals 6 and 7 denote binarization circuits, and numerals 8 and 9 denote synchronization circuits.

In a write mode, an output power of a laser source (not shown) is increased. 0-order light is used for writing and 1-order light is used for reading. A reflected light of the 0-order light from the disk 1 is sensed by the optical pickup 2 and an output signal thereof produced by a prepit train on the disk 1 is amplified by the preamplifier 4 and reshaped by the binarization circuit 6 for each prepit on the disk 1. The synchronization signal thus produced is supplied to the synchronization circuit 8 which includes a PLL circuit and a write clock is generated in synchronism with the synchronization signal. Similarly, a reflected light of the 1-order light from the disk 1 is sensed by the optical pick-up 3, and an output signal thereof produced by the prepit train is amplified by the preamplifier 5, and the amplified signal is reshaped by the binarization circuit 7 so that a synchronization signal is produced. The synchronization signal is supplied to the synchronization circuit 9 which includes a PLL circuit, which generates a read clock in synchronism with the synchronization signal.

In this manner, the data writing by the 0-order light and the data reading by the 1-order light are attained.

Figure 2:
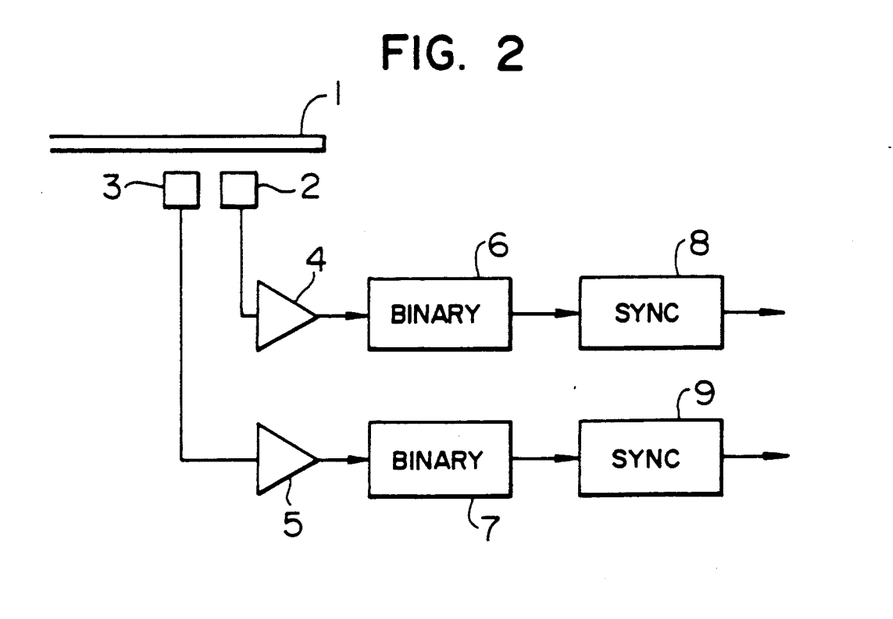
FIG. 2 shows a block diagram of an exemplary disk drive apparatus obtained in a process to the present invention.

In the disk drive apparatus shown in FIG. 2, however, it is necessary to prevent the data on the disk from being destroyed by the 0-order light in the read mode. To this end, the 0-order light may be blocked, but it is very difficult to block only the 0-order light because the 0-order light and the 1-order light are very closely located to each other. Accordingly, it is necessary to reduce the output power of the laser source to reduce the power of the 0-order light in the read mode. However, the power of the 1-order light is also reduced by decreasing the output of the laser source. The binarization circuit 7 may not correctly reproduce the synchronization signal because the output level of the optical pickup 3 produced by reading the prepit train is too low.

Because the 0-order light has a sufficient power to read the data, the 0-order light may be used to read the data in the read mode, the prepit train may be read by the 0-order light to reproduce the synchronization signal by the binarization circuit 6, and the clock produced by the synchronization circuit 8 based on the synchronization signal may be used as the read clock.

However, when the mode is switched from the read mode to the write mode, the 0-order light used to read the data in the read mode is used to write the data in the write mode, and the 1-order light is used to read the data, instead. Thus, when the mode is switched from the read mode to the write mode, the data read laser beam is switched from the 0-order light to the 1-order light. Accordingly, when the mode is switched, the read clock is switched from the output of the synchronization circuit 8 to the output of the synchronization circuit 9. Until immediately before the mode switching, the synchronization circuit 9 does not receive the correct synchronization signal because the output level of the optical pickup 3 is insufficient and the synchronization circuit 9 cannot immediately respond to a correct synchronization signal supplied from the binarization circuit 7 after the mode switching. Thus, a long pull-in time to the synchronization signal is required, and recording cannot be initiated until the pull-in is completed and a corresponding recording area is wasted. This prevents high density recording of the data.

Where two light sources are used, there are economical and practical problems such as high manufacturing cost and large size of the apparatus because each of the optical pickups is provided with the synchronization circuit.

SUMMARY OF THE INVENTION

It is an object of the present invention to provide a disk drive apparatus which solves the above problems and which permits a synchronization circuit generating a read clock to quickly pull in a status synchronized with a reproduced synchronization signal at the time of switching from the read mode to the write mode.

In order to achieve the above object, the present invention comprises a first synchronization circuit for generating a first clock based on a synchronization signal reproduced by 0-order light, a second synchronization circuit for generating a second clock based on a synchronization signal reproduced by 1-order light, as well as delay means for delaying the synchronization signal reproduced by the 0-order light and selection means for selectively supplying one of the synchronization signal reproduced by the 1-order light and the synchronization signal produced by the delay means.

The present invention further comprises control means for controlling a delay time of the delay means in accordance with radiation positions of the 0-order and 1-order lights on a radius of the disk.

The radiation positions of the 0-order light and the 1-order light on the disk are shifted trackwise. Thus, the synchronization signals reproduced thereby are out of phase. The amount of phase shift is constant when the disk is rotated at a constant linear speed, but it varies with the radiation positions of the 0-order light and the 1-order light on the radius of the disk when the disk is rotated at a constant angular velocity. The delay means compensates for the phase shift so that the phases of the synchronization signals reproduced by the 0-order light and the 1-order light are in phase or substantially in phase. When the disk is rotated at the constant linear speed, the delay time of the delay means may be constant, but when the disk is rotated at the constant angular speed, the delay time of the delay means is changed by the control means in accordance with the radiation positions of the 0-order light and the 1-order light.

In a read mode, the selection means selects the synchronization signal reproduced by the 0-order light and delayed by the delay means, and supplies it to the second synchronization circuit. In a write mode, the selection means selects the synchronization signal reproduced by the 1-order light and supplies it to the second synchronization circuit to generate a read clock for the DRAW.

Since the synchronization signal from the delay means and the synchronization signal reproduced by the 1-order light are in phase or substantially in phase, the second synchronization circuit is in synchronism or substantially in synchronism with the synchronization signal reproduced by the 1-order light, by the synchronization signal from the delay means until the switching time point from the read mode to the write mode. Accordingly, when the synchronization signal supplied to the second synchronization circuit is switched to the synchronization signal reproduced by the primary light by the mode switching, the pull-in time is significantly reduced.

Where two light sources are used, the object of the present invention is achieved by arranging a plurality of optical pickups on a reflection light path for individually detecting reflected lights from an optical recording medium, connecting a phase locked loop (PLL) circuit and a delay circuit to only a first optical pickup which detects the leading reflected light, connecting a data demodulator to the other optical pickups, and sampling a signal supplied to the data demodulator by a clock signal produced by the delay circuit.

A clock required to record and reproduce the information signal read by the first optical pickup and a clock required to record and reproduce the information signal read by the other optical pickup are of the same frequency and out of phase by an amount proportional to an interval between the light spots radiated on the magneto-optical disk.

On the other hand, a physical distance between the 1-order and 0-order light spots radiated on the magneto-optical disk is kept constant, and a linear velocity of the light spot relative to the magneto-optical disk is uniquely defined by an access position. Thus, a phase difference between the clock generated by the synchronization signal read by the first optical pickup and the clock generated by the synchronization signal read by the other optical pickup can be determined by calculation. Accordingly, by adding the calculated phase difference to the clock generated from the synchronization signal read by the first optical pickup, a clock required to record and reproduce the information read by the other optical pickup can be generated.

The clock required to record and reproduce the information signal read by the first optical pickup is generated by the PLL circuit connected to the optical pickup.

Accordingly, the clocks required to record and reproduce the information signals read by all optical pickups may be generated by providing only one PLL circuit, and the reduction of manufacturing cost and the compactness of the apparatus ar attained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Preferred embodiments of the present invention are now explained.

A type of information recording medium used in an embodiment of the present invention, the number of light sources for laser light beam spots for recording, reproducing and erasing data, and a recording/reproducing apparatus (disk drive apparatus or optical recording medium drive apparatus) which utilizes the beam spots are shown below.

| Type of recording medium | Number of light beam spot | | Number of light sources required to laser light beams |
|---|---|---|---|
| Over-write type optical disk | Recording spot<br>Reproducing spot | 1-2 | 1 or 2 |
| Magneto-optical disk | Recording spot<br>Reproducing spot<br>Erasing spot | 2-3 | 1, 2 or 3 |
| Variable phase or other erasable optical disk | Recording spot<br>Reproducing spot<br>Erasing spot | 2-3 | 1, 2 or 3 |

One spot may be shared by the recording spot and the erasing spot. In the over-write type optical disk, one spot may be shared by the recording spot and the reproducing spot.

As to the number of light sources of the laser light beam, one light source is used for each light spot or one light source is selectively used for two spots. To selectively use one light source for two spots, an intensity of the light beam is changed after information has been recorded so that the information may be reproduced by using the same light source and the same spot. Alternatively, a light beam from one light source is divided into 0-order light and 1-order light so that the 0-order light is used for the recording light spot and the 1-order light is used for the reproducing light spot.

Figure 7:
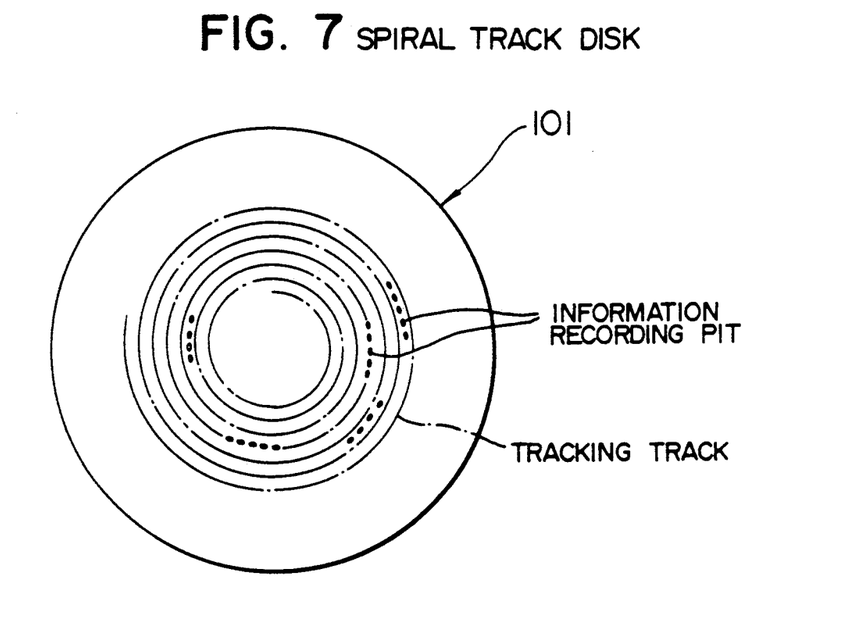
FIGS. 7 and 8 show track patterns.
Figure 8:
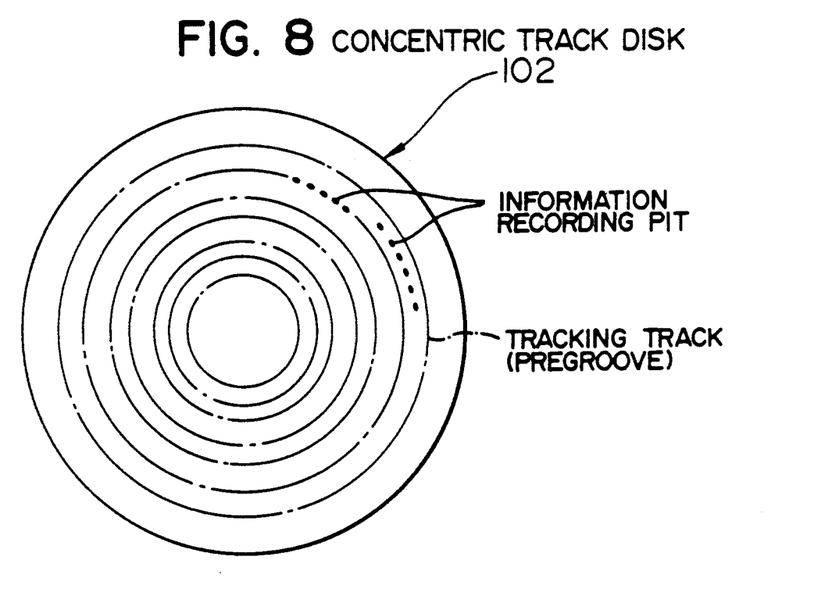

The present embodiment is applicable to any of the above recording media and any number of laser beam light sources may be used in the recording and reproducing apparatus. In essence, the present embodiment relates to a disk drive apparatus or recording and reproducing apparatus in a system in which two beam spots, a tracking beam spot and an information recording/reproducing beam spot, are used in recording and reproducing information to and from the optical recording medium having a tracking track and information signals recorded therein, in which a delay circuit 10 is provided so that a clock signal may be shared by the two beam spot generators. Accordingly, the present embodiment can be applied to a recording and reproducing apparatus other than an optical recording medium type such as magnetic recording medium type. The track pattern of the disk recording medium is a spiral type or a concentric type shown in FIGS. 7 and 8. The information is recorded on the tracks or between tracks. Four combinations of the patterns are shown in FIGS. 7 and 8. The present embodiment is applicable to any of the above recording media.

[Embodiment 1]

Figure 1:
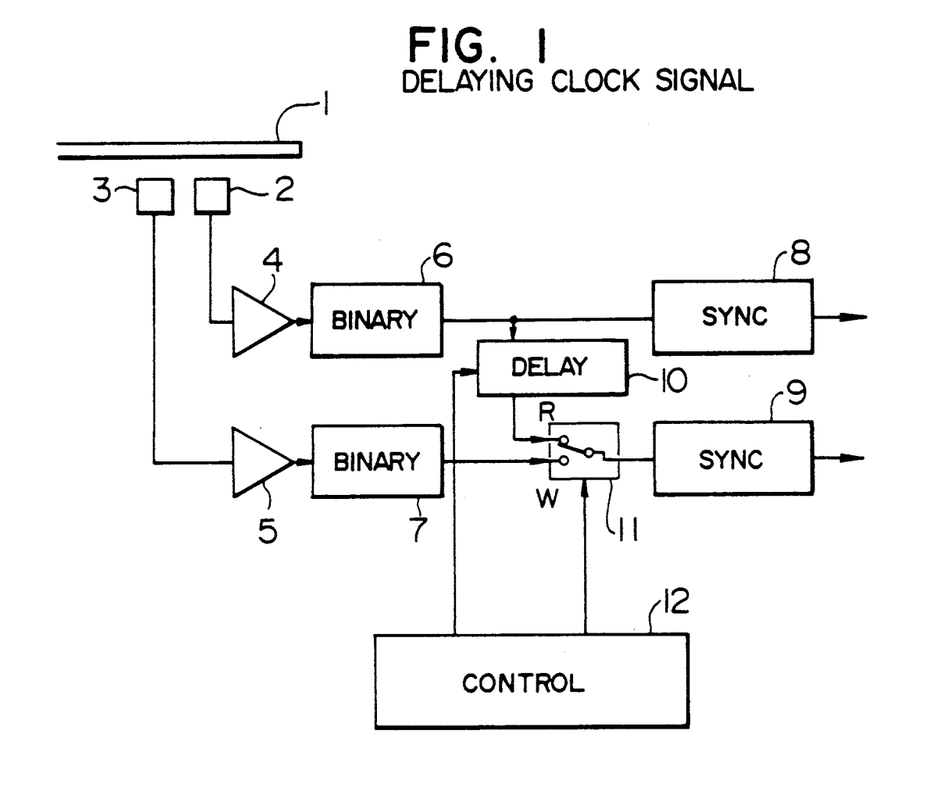
FIG. 1 shows a block diagram of one embodiment of a disk drive apparatus of the present invention.

FIG. 1 shows a block diagram of a first embodiment of the disk drive apparatus of the present invention. Numeral 10 denotes a delay circuit, numeral 11 denotes a switching circuit, and numeral 12 denotes a control circuit. The elements similar to the elements shown in FIG. 2 are designated by like numerals and a duplicated explanation is omitted.

It is assumed that the disk 1 is rotated at a constant angular velocity.

In a data write mode, an output power of a laser source (not shown) is increased so that 0-order light has sufficient power to write data into the disk 1. The switching circuit 11 is controlled by the control circuit 12 and the switching circuit 11 is closed to W in the data write mode.

The 0-order light is reproduced by reading the prepit train on the disk 1, and the synchronization signal reshaped by the binarization circuit 6 is supplied to the synchronization circuit 8 so that a clock for writing data is generated. The 1-order light is reproduced by reading the prepit train on the disk 1 read by the 0-order light, and the synchronization signal reshaped by the binarization circuit 7 is supplied to the synchronization circuit 9 through the switching circuit 11 so that a data read clock is generated. Desired data is written on the disk 1 following to the read prepit train at a timing of the clock produced by the synchronization circuit 8. The 1-order light immediately reads the desired data written following the prepit train, and whether the desired data has been correctly written or not is checked based on the clock produced by the synchronization circuit 9.

In this manner, the DRAW is placed in the write mode.

In the data read mode, the output power of the laser source is set low so that the 0-order light does not destroy the data written on the disk 1 and the output of the optical pickup 2 is of a sufficiently high level. The switching circuit 11 is switched to R.

As in the write mode, the synchronization signal is produced by the binarization circuit 6 as the prepit train is read by the 0-order light. The synchronization signal is supplied to the synchronization circuit 8, and the synchronization signal is also delayed in the delay circuit 10 and then supplied to the synchronization circuit 9 through the switching circuit 11. Thus, the synchronization circuit 9 produces the clock which is in synchronism with the supplied synchronization signal.

The radiation positions of the 0-order light and the 1-order light on the disk 1 are shifted longitudinally of the track on the disk 1. As a result, the 1-order light reads the same prepit train as that the 0-order light has read, with a slight delay, and there is a phase difference between the synchronization signal reproduced by the 0-order light and the synchronization signal reproduced by the 1-order light.

The delay circuit 10 serves to eliminate the phase difference. The delay circuit 10 delays the synchronization signal produced by the binarization circuit 6 to render the phase of the synchronization signal to be in phase with the synchronization signal produced by the binarization circuit 7. Where the disk 1 is rotated at a constant angular velocity, the phase difference between the synchronization signals produced by the binarization circuits 6 and 7 varies with the radiation positions of the 0-order light and the 1-order light on the radius of the disk 1. Thus, the control circuit 12 changes the delay time of the delay circuit 10 in accordance with the radiation positions of the 0-order light and the 1-order light so that the phase of the synchronization signal produced by the delay circuit 10 is always in phase or substantially in phase with the synchronization signal produced by the binarization circuit 7.

Where the disk 1 is rotated at a constant linear velocity, the phase difference between the synchronization signals produced by the binarization circuits 6 and 7 is constant wherever the radiation positions of the 0-order light and the 1-order light on the disk 1 are. Accordingly, the delay time of the delay circuit 10 is fixed.

When the mode is switched from the read mode to the write mode, the switching circuit 11 is switched from R to W so that the input signal to the synchronization circuit 9 is switched from the synchronization signal produced by the delay circuit 10 to the synchronization signal produced by the binarization circuit 7. Since those synchronization signals are in phase or substantially in phase, there is no substantial discontinuity of phase of the synchronization signal supplied to the synchronization circuit 9 at the time of switching from R to W by the switching circuit 11. Accordingly, there is no substantial disturbance in synchronization in the synchronization circuit 9.

In the read mode, the data is read from the disk 1 by the power-reduced 0-order light, and the read clock is generated by the synchronization circuit 8 in synchronism with the synchronization signal reproduced by the 0-order light and the data is reproduced. The synchronization circuit 9 is in synchronism with the synchronization signal reproduced by the 0-order light and delayed by the delay circuit 10. The synchronization status of the synchronization circuit 9 is equivalent to the synchronization status to the synchronization signal if such a synchronization signal would be reproduced by the 1-order light. Thus, when the switching circuit 11 is switched from R to W at the switching time from the read mode to the write mode, the synchronization circuit 9 is substantially and simultaneously pulled into the synchronization signal which is reproduced by the 1-order light and supplied from the binarization circuit 7 through the switching circuit 11.

[Embodiment 2]

Figure 3:
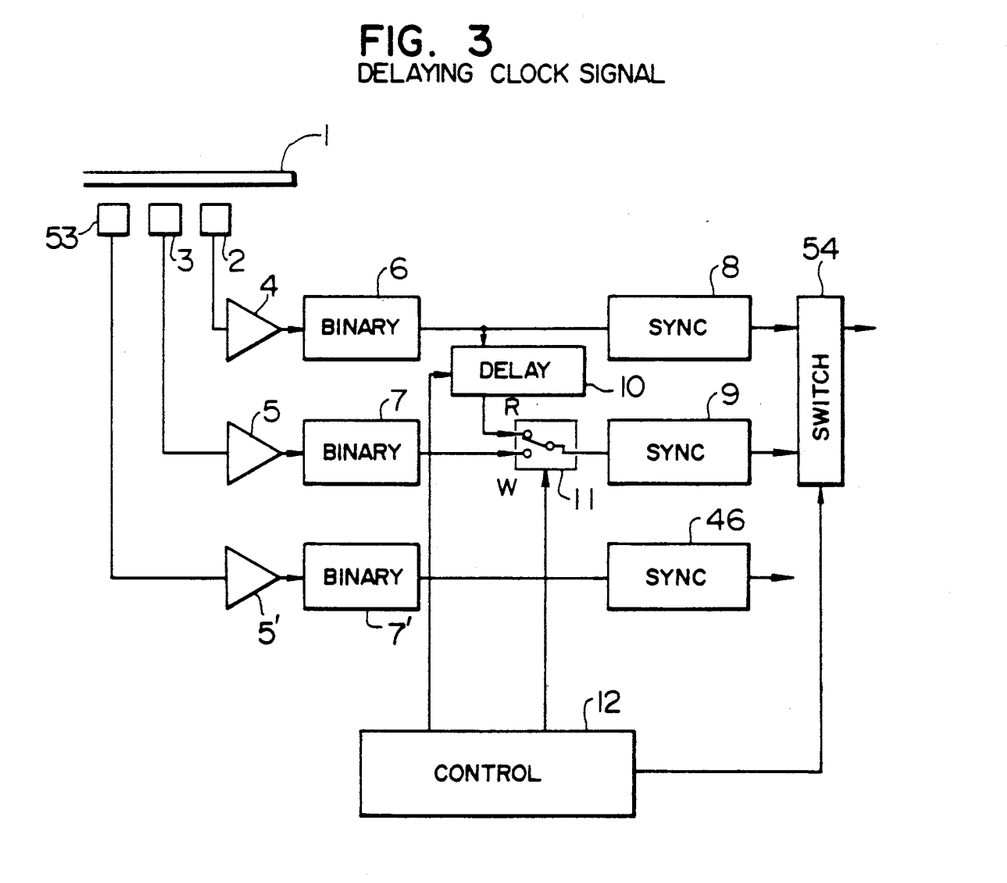
FIG. 3 shows a block diagram of another embodiment of the disk drive apparatus of the present invention.

FIG. 3 shows a second embodiment of the disk drive apparatus in which a further light source is provided in the embodiment of FIG. 1. Numeral 53 denotes an optical pickup, numeral 5' denotes a preamplifier, numeral 7' denotes a binarization circuit, numeral 54 denotes a switch circuit for selecting an effective synchronization signal out of the synchronization circuits 8 and 9 and numeral 46 denotes a synchronization circuit. A clock produced by the synchronization circuit 46 is not directly related to the clock produced by either synchronization circuit 8 or 9.

[Embodiment 3]

A third embodiment of the magneto-optical disk drive apparatus having an incident optical system for scanning two light spots along a record track is now explained.

Figure 4:
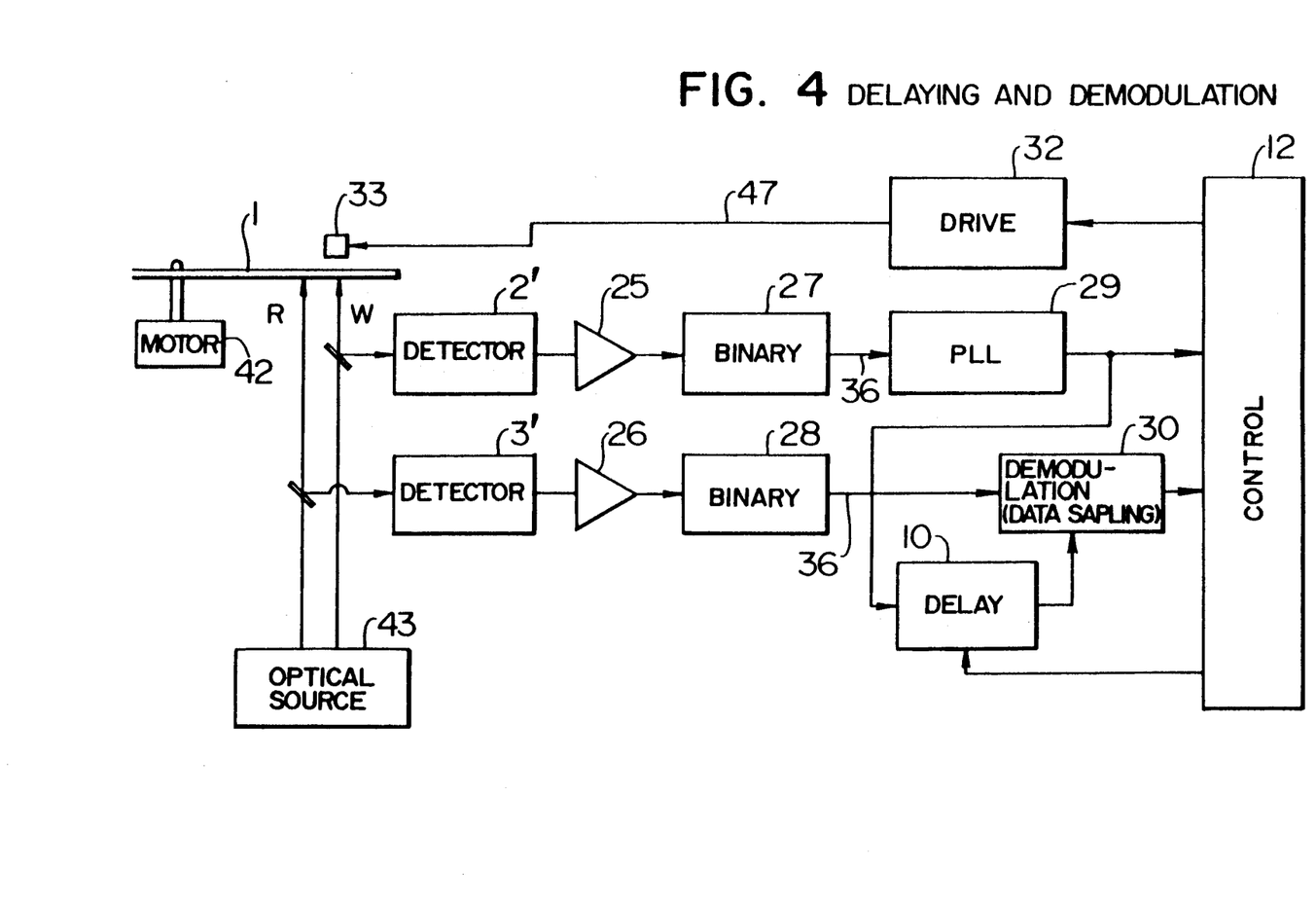
FIG. 4 shows a block diagram of another embodiment of the optical recording medium drive apparatus of the present invention.

FIG. 4 shows a block diagram of the magneto-optical disk drive apparatus of the present embodiment. The apparatus includes a spindle motor 42 for rotating a magneto-optical disk 1, an incident optical system 43 for focusing two light spots onto the magneto-optical disk, two optical pickups or detectors 2' and 3' for individually detecting reflected light from the magneto-optical disk 1, a reproducing circuit 36 for reproducing data from the signals read by the optical pickups 2' and 3', a recording circuit 47 for applying a magnetic field to the magneto-optical disk 1, and a controller 12 for controlling the reproducing circuit 36 and the recording circuit 47.

The magneto-optical disk 1 is of circular shape in a plan view, and a second area is a ring-shaped area excluding an innermost peripheral area and an outermost peripheral area. Guide tracks, either spiral or concentric, for guiding a light spot are formed in the record area concentrically to the rotation center of the magneto-optical disk 1. The record area is divided into a plurality of circumferential sectors, and prepit trains such as an address pit train for indicating sector address and a clock pit train for generating a clock signal are preformatted in each sector of each guide track.

Figure 5:
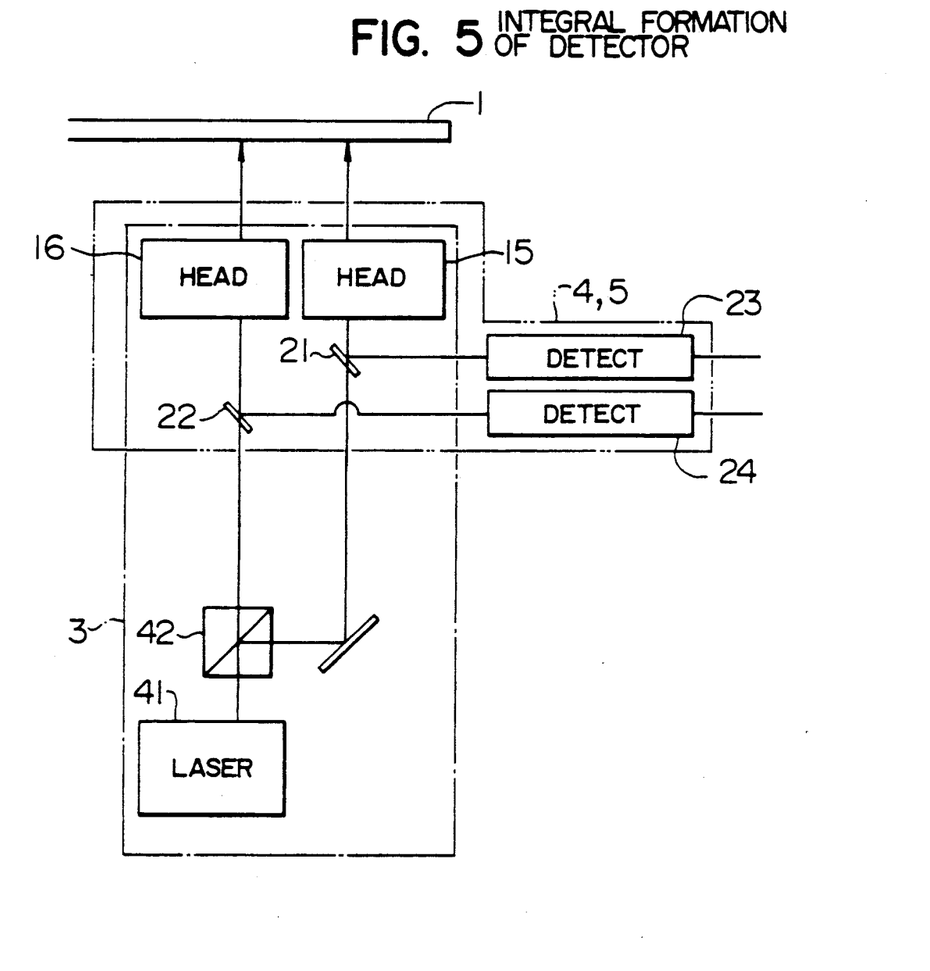
FIG. 5 shows an optical circuit of an incident optical system and an optical pickup.
Figure 6:
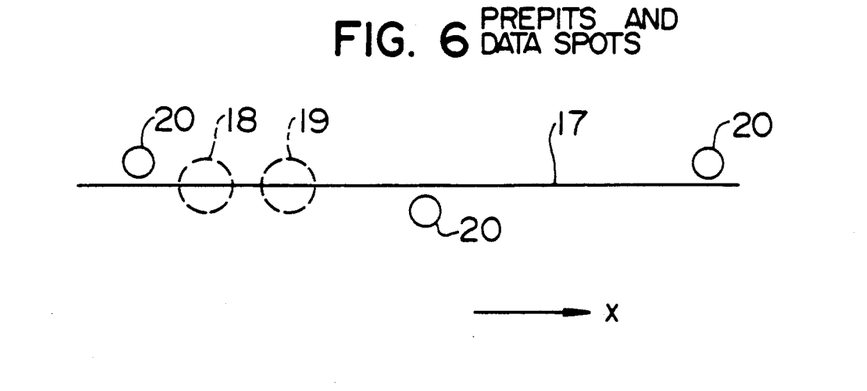
FIG. 6 is a plan view showing light spots radiated on the optical recording medium.

As shown in FIG. 5, the incident optical system 43 includes a laser light source 41, a beam splitter 42 for dividing a laser beam emitted from the laser light source 41 into two beams, two optical modulators 13 and 14, and two optical heads 15 and 16 for focusing modulated lights onto the magneto-optical disk 1. As shown in FIG. 6, the two optical heads 15 and 16 are arranged such that two light spots 18 and 19 are radiated on one track 17 with a constant interval. In FIG. 6, numeral 20 denotes a prepit preformatted on the magneto-optical disk 1, and X indicates a rotation direction of the magneto-optical disk 1.

The optical pickups include the optical heads 15 and 16, half-mirrors 21 and 22 and photo-detectors 23 and 24. The two optical pickups may be integrally formed as shown in FIG. 5.

The reproducing circuit 36 includes a first amplifier 25 connected to the first photo-detector 23, a second amplifier 26 connected to the second photodetector 24, a first binarization circuit 27 connected to the first amplifier 25, a second binarization circuit 28 connected to the second amplifier 26, a PLL circuit 29 connected to the first binarization circuit 27, a data demodulator 30 connected to the second binarization circuit 28, and a delay circuit 10 connected to the PLL circuit 29 for supplying a delayed clock to the data demodulator 30 under the control of a controller 12 as shown in FIG. 4.

The binarization circuits 27 and 28 convert the output signals of the amplifiers 25 and 26 to digital signals, and the PLL circuit 29 generates a clock which is synchronized with the clock pit train of the magneto-optical disk 1, based on the output signal from the first binarization circuit 27. The data demodulator 30 samples the output signal (information signal) of the second binarization circuit 28 by the clock generated from the delay circuit 10.

The delay time of the delay circuit 10 is set such that the clock signal produced by the PLL circuit 29 is delayed by an amount corresponding to a phase difference between the synchronization signal read by the first optical pickup 2' and the synchronization signal read by the second optical pickup 3'. The delay time is determined based on a physical distance between the two light spots 18 and 19 radiated on the magneto-optical disk 1 and a scan speed of the light spots 18 and 19 in the sector relative to the magneto-optical disk 1.

The recording circuit includes a magnetic head drive circuit 32 controlled by the controller 12, and a magnetic head 33 driven thereby. The magnetic head 33 is arranged at a position which is on the opposite side of the magneto-optical disk 1 to the incident optical system 43 and which faces the first light spot 18.

The operation of the present magneto-optical disk drive apparatus is now explained.

In the record mode, the spindle motor 42 on which the magneto-optical disk 1 is mounted is driven. When a desired sector is selected, the optical heads 15 and 16 are driven to the position facing the guide track which includes the selected sector, and the two light spots 18 and 19 are scanned along the guide track. The powers of the two light spots 18 and 19 are set low by the optical modulators 13 and 14. Focusing servo control and tracking servo control for the optical heads 15 and 16 are effected by detecting the reflected light pattern of the first light spot 18 radiated upstream of the magneto-optical disk, by the photodetector 23.

The reflected lights of the light spots 18 and 19 scanned along the guide track are individually detected by the optical pickups 2' and 3'. Thus, the address signal is read from the address pit train preformatted on the magneto-optical disk 1, and the synchronization signal is read from the clock pit train.

The signal read by the first optical pickup 2' arranged upstream of the magneto-optical disk 1 is amplified by the first amplifier 25 and the amplified signal is converted to a digital signal by the first binarization circuit 27. The PLL circuit 29 generates a clock signal which is synchronized with the synchronization signal read by the first optical pickup 2'. The controller 12 reads the address signal in accordance with the clock generated by the PLL circuit 29 and determines whether the address signal is the selected sector or not.

If the selected sector is detected, the output of the first optical modulator 13 is changed by a command from the controller 12 so that the power of the first light spot 18 emitted from the first optical head 15 is switched to a level to raise the record layer of the magneto-optical disk 1 to a vicinity of the Curie point. The magnetic head drive circuit 32 is also driven by a command from the controller 12 so that a magnetic field signal is applied to the record layer from the magnetic head 33. In this manner, the information is recorded.

The recorded information is immediately reproduced by the second optical pickup 3' arranged downstream of the magneto-optical disk to check record error. The signal read by the second optical pickup 3' is amplified by the second amplifier 26 and the signal read is converted to a digital signal by the second binarization circuit 28. The output signal from the second binarization circuit 28 is also supplied to the data demodulator 30, and the demodulated output signal is sampled by the clock generated by the delay circuit 10 under control of the controller 12. The phase of the clock generated by the delay circuit 10 is retarded relative to the phase of the clock generated by the PLL circuit 29, by an amount corresponding to the phase difference between the synchronization signal read by the first optical pickup 2' and the synchronization signal read by the second optical pickup 3'. Thus, the information is reproduced.

In the reproduction mode, the power of the first light spot 18 is lowered and a similar operation to the reproduction operation previously described is carried out.

In the magneto-optical disk drive apparatus of the present embodiment, all clocks necessary to record and reproduce the information signals read by the two optical pickups can be generated by providing only one PLL circuit. Accordingly, the apparatus can be manufactured with a low cost and in a compact size.

In the present embodiment, two light spots are radiated onto the magneto-optical disk, although any number of light spots may be radiated.

In the present embodiment, the magneto-optical disk drive apparatus is shown and described. However, the present invention is not limited thereto but the present invention is applicable to any optical recording medium drive apparatus in which a plurality of light spots ar radiated.

The present invention relates to the synchronization circuit and other components which are not limited to those of the embodiment. For example, in the present embodiment, the incident optical system has one laser light source and the laser beam emitted from the laser light source is split by the beam splitter. Alternatively, a plurality of laser light sources may be provided.

Figure 9:
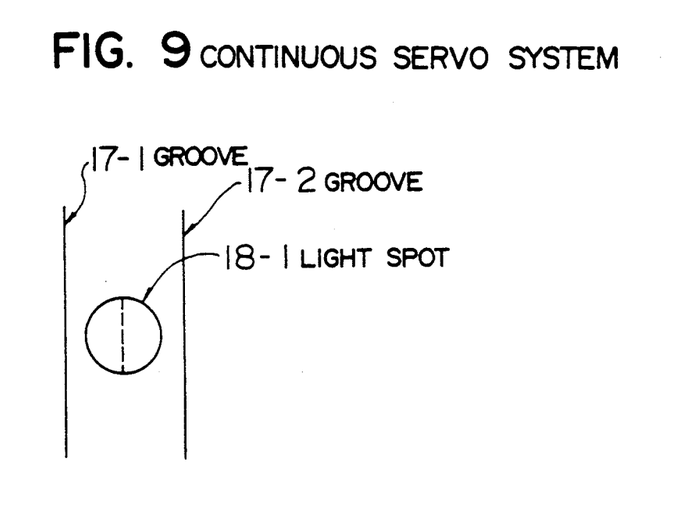
FIGS. 9 and 10 show tracking systems.
Figure 10:
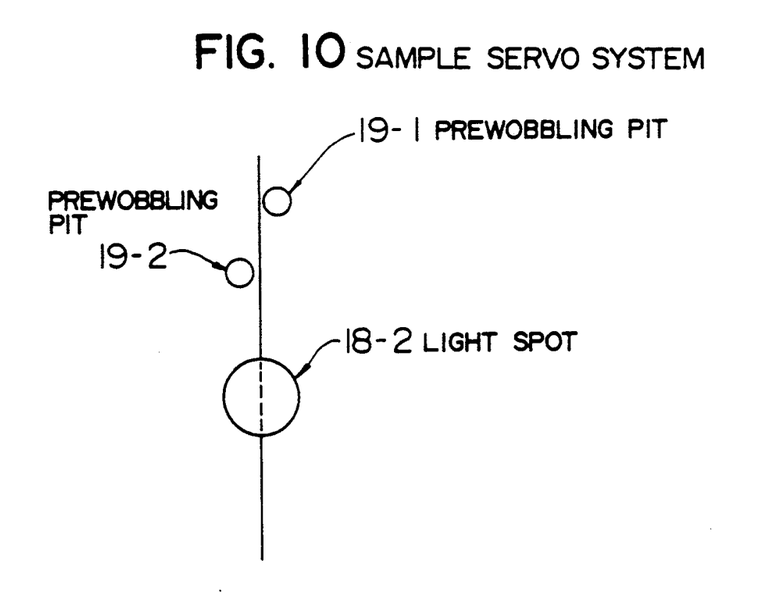

As to the medium (optical disk) whether the information signal area is the spiral disk 101 or the concentric disk 102 (FIGS. 7 and 8) does not substantively affect the present invention. In the disks 101 and 102, the information signal area may be between grooves 17-1 and 17-2 as shown in FIG. 9, or the information signal area may be on a center line and tracking may be effected by using prewobbled pits 19-1 and 19-2, as shown in FIG. 10. In the disk 101 having the spiral track, the system shown in FIG. 9 is standardized as a continuous servo system, and the system shown in FIG. 10 is standardized as a sample servo system by the ISO-1971. The tracking servo can be made by dividing a light detector into left and right sections to provide a difference signal between respective signals thereon using the 0-order light signal.

The synchronization clocks for the data read from the light spots in the present invention are summarized below. Representative examples of the embodiments 1, 2 and 3 are shown.

| Item | Number of light sources | First light source (write mode) 0-order light | First light source (write mode) 1-order light | First light source (read mode) 0-order light | First light source (read mode) 1-order light | Second light source |
|---|---|---|---|---|---|---|
| 1 | 1 | Clock read by 0-order light | Clock read by 1-order light | Clock read by 0-order light | Clock read by 1-order light (unstable) | — |
| 2 | 1 | Clock read by 0-order | Clock read by 0-order | Clock read by 0-order | Clock read by 0-order | — |

-continued

| Item | Number of light sources | First light source (write mode) 0-order light | First light source (write mode) 1-order light | First light source (read mode) 0-order light | First light source (read mode) 1-order light | Second light source |
|---|---|---|---|---|---|---|
| | | light | light ⊕ delay | light | light ⊕ delay | |
| 3 | 1 | Clock read by 0-order light | Clock read by 0-order light ⊕ delay | Clock read by 0-order light | Clock read by 1-order light | — |
| 4 | 2 | Clock read by 0-order light | Clock read by 0-order light ⊕ delay | Clock read by 0-order light | Clock read by 1-order light | Clock read by detector of second light source |

Disadvantages in the FIG. 2 system No. 1

① Clock read by the 1-order light is unstable in the read mode.

② Power (laser power) is raised until the clock reaches the readable level. (The light spot which is not actually used is directed to the medium in order to generate the clock. This is not good for the medium because the medium is deteriorated).

In accordance with the present invention, the synchronization circuit for generating the read clock in the write mode is substantially synchronized in the read mode with the synchronization signal reproduced by the 1-order light. Thus, when the synchronization signal reproduced by the 1-order light is supplied to the synchronization circuit at the switching time from the read mode to the write mode, the pull-in time of the synchronization circuit to the synchronization signal is significantly reduced.

Further, the clocks necessary for recording and reproducing the information signals read by all optical pickups may be generated by providing only one PLL circuit, and the manufacturing cost may be reduced and the compact apparatus may be attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A disk drive apparatus for deriving a 0-order light and a 1-order light from an output laser beam of a single laser source by a diffraction grating, reading a prepit train on a disk by the 0-order light and the 1-order light to reproduce synchronization signals, generating a first clock by a first synchronization circuit based on the synchronization signal reproduced by the 0-order light, and generating a second clock by a second synchronization circuit by the synchronization signal reproduced by the 1-order light, comprising:

first and second detecting means for supplying first and second read signals;

delay means for delaying the synchronization signal reproduced by the 0-order light; and selection means for selecting the synchronization signal reproduced by the 1-order light in a write mode and the synchronization signal produced by said delay means in a read mode and supplying the selected synchronization signal to said second synchronization circuit;

said first clock being used as a data write clock in the write mode and as a data read clock in the read mode, said second clock being used as the data read clock in the write mode.

2. A disk drive apparatus according to claim 1 further comprising control means for changing a delay time of said delay means in accordance with radial radiation positions of the 0-order light and the 1-order light on the disk.

3. An optical recording medium drive apparatus having an incident optical system for scanning a plurality of light spots arranged at a constant pitch along a record track of an optical recording medium, comprising:

a plurality of optical detectors arranged on a reflection light path for individually detecting reflected light from said optical recording medium;

a first one of said optical detectors for detecting a leading reflected light being connected to a phase locked loop circuit and a delay circuit for delaying a clock signal produced by said phase locked loop circuit by an amount corresponding to a phase difference between a synchronization signal read by said first optical detector and a synchronization signal read by a second one of said optical detectors, said second optical detector being connected to a data demodulator; and an input signal to said data demodulator being sampled by the clock signal produced by said delay circuit.

4. An optical recording medium drive apparatus according to claim 3 wherein said plurality of optical pickups are integrally formed.

5. A disk drive apparatus for reproducing a synchronization signal comprising:

first and second detecting means for supplying first and second read signals, respectively;

delay means for delaying one of said first and second read signals to provide the synchronization signal;

selection means for selecting said one of said first and second read signals in a synchronization signal read mode and the other of said first and second read signals in a write mode; and switch means for selecting said one of said first and second read signals in a read mode and the other of said first and second read signals in a write mode to provide a read clock for read data.

6. A disk device apparatus according to claim 5, further comprising:

synchronization means connected to the output of one of said first and second detecting means for executing a phase-lock operation; and synchronization means connected to said switch means for executing a phase-lock operation.

* * * * *